US010554106B2

(12) United States Patent
Ponzio et al.

(10) Patent No.: US 10,554,106 B2
(45) Date of Patent: *Feb. 4, 2020

(54) APPARATUS FOR WINDING AND TERMINATING DYNAMO ELECTRIC MACHINE CORES

(71) Applicant: ATOP S.p.A., Barberino Val d'Elsa, Florence (IT)

(72) Inventors: Massimo Ponzio, Florence (IT); Maurizio Mugelli, Siena (IT)

(73) Assignee: ATOP S.p.A., Barberino Val d'Elsa, Florence (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,060

(22) Filed: May 9, 2019

(65) Prior Publication Data
US 2019/0267875 A1 Aug. 29, 2019

Related U.S. Application Data

(60) Continuation of application No. 15/663,229, filed on Jul. 28, 2017, now Pat. No. 10,340,775, which is a
(Continued)

(30) Foreign Application Priority Data

Apr. 29, 2009 (IT) ................ PI2009A0050

(51) Int. Cl.
*H02K 15/00* (2006.01)
*H02K 15/095* (2006.01)
(52) U.S. Cl.
CPC ..... *H02K 15/0068* (2013.01); *H02K 15/0075* (2013.01); *H02K 15/095* (2013.01);
(Continued)

(58) Field of Classification Search
CPC ........... H02K 15/0068; H02K 15/0075; H02K 15/095
See application file for complete search history.

(56) References Cited

U.S. PATENT DOCUMENTS 3,973,601 A 8/1976 Arnold et al.
3,995,785 A 12/1976 Arick et al.
(Continued)

FOREIGN PATENT DOCUMENTS

EP 0 982 837 3/2000
EP 1 990 899 11/2008
(Continued)

OTHER PUBLICATIONS

International Search Report dated Oct. 18, 2010 for WO2010/124854.

*Primary Examiner* — Emmanuel M Marcelo
(74) *Attorney, Agent, or Firm* — Haley Guiliano LLP

(57) ABSTRACT

An apparatus used in terminating and winding coils of a core of a dynamo electric machine. The coils being formed from at least an electric wire and the core having a longitudinal axis. The coils are wound by relatively moving a wire dispenser with respect to a core with relative motions of translation and rotation; at least a stretch of wire extends from the coil; and the stretch of wire is provided with a portion for a termination connection to a termination structure of the core, such as a tang. The method avoids waste cut wire in the apparatus. The core is provided with a groove at an end to receive at least a wire in the path of the wire for the termination of the coils. The apparatus comprises a wire deflector positioned adjacent the end of the core, where the groove is located, in order to intercept and align the wire with the groove. The apparatus can comprise a device for applying torques in two directions on a pulley wheel for
(Continued)

feeding wire as a function of the position of the dispenser in the translation and the position of the core in the rotations.

3 Claims, 11 Drawing Sheets

Related U.S. Application Data division of application No. 14/814,649, filed on Jul. 31, 2015, now Pat. No. 9,755,487, which is a division of application No. 14/080,083, filed on Nov. 14, 2013, now Pat. No. 9,130,436, which is a division of application No. 13/266,087, filed as application No. PCT/EP2010/002602 on Apr. 28, 2010, now Pat. No. 8,607,436.

(52) U.S. Cl.
CPC .... *Y10T 29/49009* (2015.01); *Y10T 29/49071* (2015.01); *Y10T 29/49073* (2015.01); *Y10T 29/49174* (2015.01); *Y10T 29/53143* (2015.01); *Y10T 29/53161* (2015.01)

(56) References Cited

U.S. PATENT DOCUMENTS

| | | | |
|---|---|---|---|
| 4,157,165 A | 6/1979 | Bierman et al. | |
| 4,997,138 A | 3/1991 | Luciani et al. | |
| 5,063,279 A | 11/1991 | Rossi | |
| 5,273,223 A | 12/1993 | Tsugawa | |
| 5,493,770 A | 2/1996 | Anichini | |
| 5,647,405 A | 7/1997 | Fichtner et al. | |
| 5,826,774 A | 10/1998 | Dell'Aglio | |
| 6,029,925 A | 2/2000 | Yano | |
| 6,098,912 A | 8/2000 | Noji | |
| 6,532,645 B1 | 3/2003 | Becherucci | |
| 6,702,222 B2 | 3/2004 | Meier | |
| 6,732,970 B2 | 5/2004 | Dolgas et al. | |
| 6,959,486 B2 | 11/2005 | Ponzio et al. | |
| 7,156,260 B2 * | 1/2007 | Hayduk | B29B 7/7433 222/145.5 |
| 7,370,401 B2 | 5/2008 | Stratico et al. | |
| 8,230,585 B2 | 7/2012 | Ponzio et al. | |
| 8,424,792 B2 | 4/2013 | Ponzio et al. | |
| 8,607,436 B2 | 12/2013 | Ponzio et al. | |
| 8,616,487 B2 | 12/2013 | Muguelli et al. | |
| 9,130,436 B2 | 9/2015 | Ponzio et al. | |
| 2001/0047580 A1 | 12/2001 | Stratico et al. | |
| 2002/0129717 A1 | 9/2002 | Helland | |
| 2004/0163232 A1 | 8/2004 | Becherucci et al. | |
| 2005/0006519 A1 | 1/2005 | Becherucci et al. | |
| 2005/0029391 A1 * | 2/2005 | Cocciadiferro | B65H 19/10 242/559.1 |
| 2005/0072802 A1 * | 4/2005 | Hanna | B29B 7/7663 222/145.5 |
| 2005/0156076 A1 | 7/2005 | Ponzio et al. | |
| 2007/0181732 A1 | 8/2007 | Noji et al. | |
| 2012/0055017 A1 * | 3/2012 | Ponzio | H02K 15/0075 29/857 |
| 2012/0124822 A1 | 5/2012 | Ponzio | |
| 2014/0151489 A1 * | 6/2014 | Ponzio | H02K 15/095 242/432.6 |
| 2016/0126815 A1 | 5/2016 | Ponzio | |

FOREIGN PATENT DOCUMENTS

| | | |
|---|---|---|
| JP | 7-123656 | 5/1995 |
| WO | WO 01/80406 | 10/2001 |

* cited by examiner

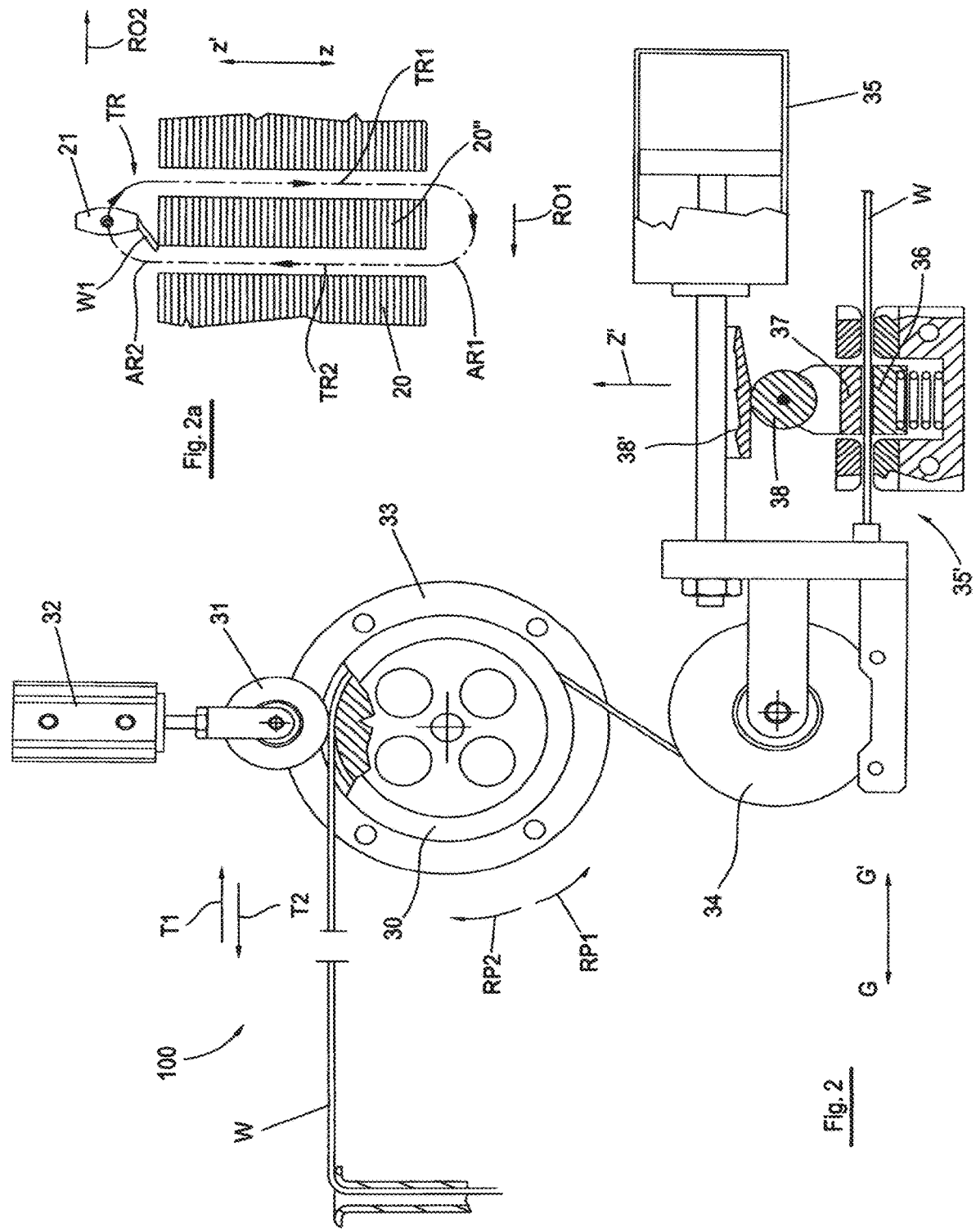

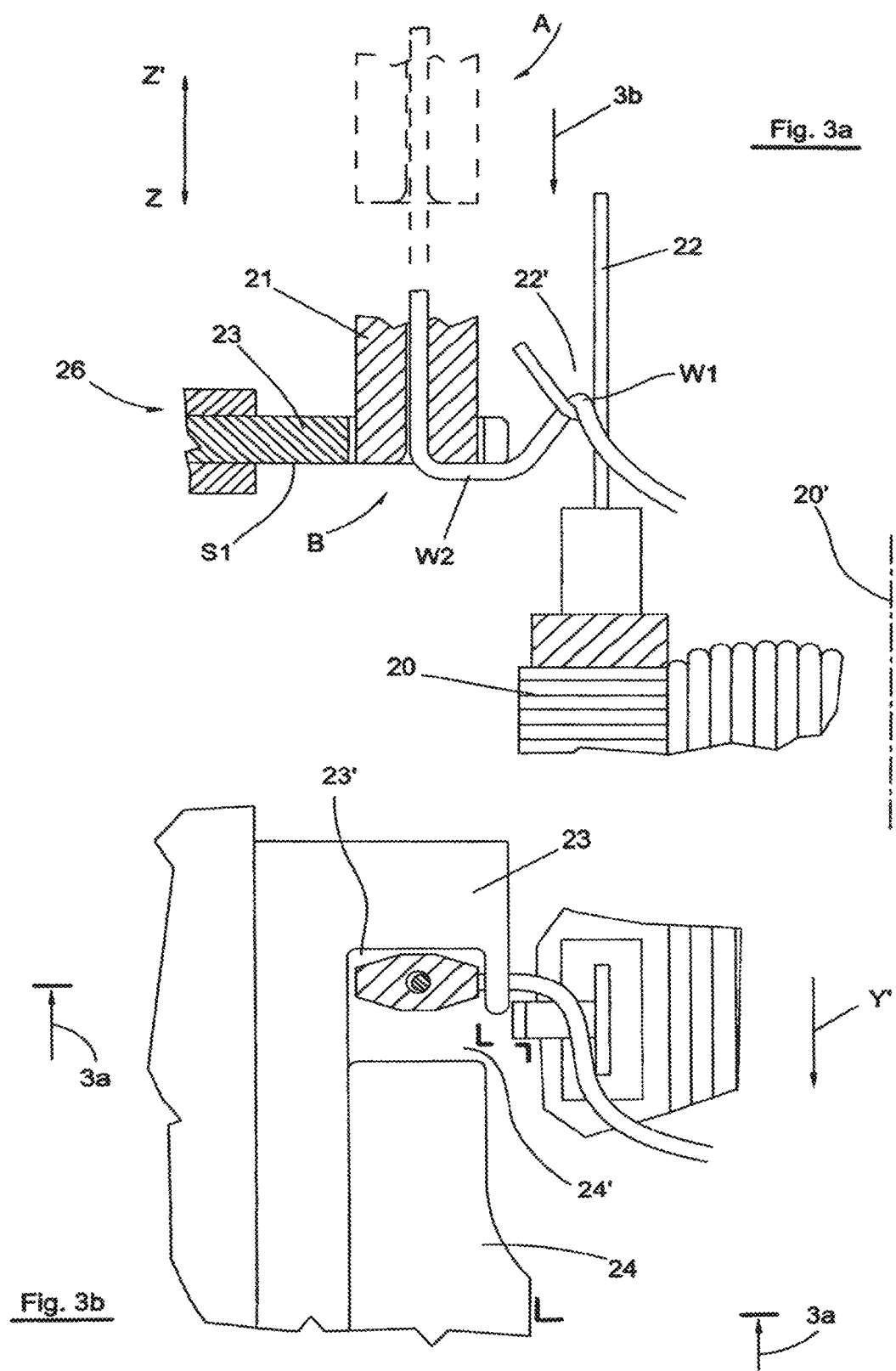

APPARATUS FOR WINDING AND TERMINATING DYNAMO ELECTRIC MACHINE CORES

CROSS-REFERENCE TO RELATED APPLICATIONS

This is a continuation of U.S. patent application Ser. No. 15/663,229, filed Jul. 28, 2017 (now U.S. Pat. No. 10,340, 775), which is a division of U.S. patent application Ser. No. 14/814,649, filed Jul. 31, 2015 (now U.S. Pat. No. 9,755, 487), which is a division of U.S. patent application Ser. No. 14/080,083, filed Nov. 14, 2013 (now U.S. Pat. No. 9,130, 436), which is a division of U.S. patent application Ser. No. 13/266,087, filed Oct. 24, 2011 as the United States National Stage of International Patent Application No. PCT/EP2010/ 002602, filed Apr. 28, 2010 (now U.S. Pat. No. 8,607,436), each of which is hereby incorporated herein by reference in its respective entirety.

FIELD OF THE INVENTION

The present invention relates to winding coils of dynamo electric machines.

In particular the solutions of the invention relate to winding coils and terminating coil wires of dynamo electric machine cores.

DESCRIPTION OF THE PRIOR ART

A wire dispenser normally referred to as "needle" releases at least an electric wire for forming a wound coil having a predetermined number of turns. Before and after the winding operation, the termination wires of the coils are connected to terminal structures which are assembled on the core. These connection operations are normally referred to as "termination" operations.

Once the terminal structures have been terminated they are connected to the electric supply by means of plugs, or by using further wire connections.

The termination wires are placed along predetermined trajectories to be in contact and anchored to the terminal structures. The terminal structures can be provided with receiving seats where the termination wires are positioned. Portions of the terminal structures forming the receiving seats can be heated and deformed around the termination wire to form a fused joint, as described in EP419849A1. Typical terminal structures having this type of configuration are tang terminals, as described in EP419849A1.

The termination requires cutting the wire in excess that extends from the terminal structure. This cutting step is necessary to free the core from the wire of the needle once the winding has been completed; in other words, cutting the wire that extends from the terminal structure results in waste wire, which needs to be collected in the winding apparatus and afterwards recycled.

In order to precisely position the termination wire with respect to the terminal structure, the wire dispenser is relatively moved with respect to the core to deposit the wire on a predetermined trajectory. This can require changing the orientation of the wire passage of the wire dispenser with respect to the orientation used during winding.

More particularly, in order to wind the coils, the passage channel where the wire of the dispenser runs is normally positioned perpendicular to the longitudinal axis of the core. The longitudinal axis of the core is commonly central and parallel to the extension of the core slots where the coils are placed during the winding operations.

The dispenser can be oriented by means of a rotation mechanism which positions the wire passage parallel to the longitudinal axis of the core when the termination wires need to be formed and positioned.

Winding apparatus and mechanisms for rotating the dispenser between the two orientations are described in EP0982837A1.

The coils wound on the core can be connected by stretches of wire which are positioned along predetermined paths of the end structures of the core. These connection wire stretches are formed by extracting wire from the dispenser when the dispenser is adjacent an end of the core. The operation is commonly referred to a "intermediate termination". Normally the ends of the core where the paths are formed is where the structure of the dispenser is not required to extend along the core.

For some winding and termination schemes the paths of the intermediate termination need to be accomplished on an opposite end of the core; that is on the end of the core which requires the dispenser structure to extend along the core to dispense the necessary wire amount.

The wire dispenser releases the electric wire to wind the coils by relatively moving with respect to the poles of the core. The relative movement of the dispenser can consist of two reciprocating translations for releasing the wire in the two stretches of the coils which are parallel to the axis of the core, and two combinations consisting of translations of the dispenser and rotations of the core for releasing the wire in the two stretches of the coils that are near to the ends and outside the core.

As mentioned in the foregoing, the dispenser is provided with an end part where wire exits to reach the core. This end part consists of a tubular member which guides the wire very accurately to position it along the required stretches of the wire. The end part is usually positioned perpendicular to the axis of the core during winding. The wire reaches the end part by first running along a stretch which is parallel to the axis of the core, and then accomplishes a curve of approximately 90° to enter the end part.

The end part can have very small width because it is required to pass in extremely narrow spacing of the cores (for example inside the slots of the core). Consequently the passage of the wire in the dispenser can be narrow, thereby causing a certain resistance to running of the wire.

The size of the wire used to wind coils of modern motors can be of large diameter compared to the spacing where the wire is wound (for example with respect to the dimensions of the passage where the wire passes to enter the slots); that is the wire can have a diameter that is the order of 1 mm and more.

The fact of using wire of this size and the presence of the narrow passages where the wire runs within the dispenser, and also the curves that need to be accomplished by the wire, cause considerable tension in the wire during some of the relative motions accomplished by the dispenser and the core to wind and terminate.

An excessive tension on the wire causes stretching the wire too much, which worsens the quality of the finished cores. For example, considerable tension during the translation of the dispenser when it moves parallel to the longitudinal axis of the core can arise. Also, there can be a considerable decrease in tension when the translation of the dispenser and the rotation of the core occur to release the wire in the two stretches of the coil that are at the ends of the core. These reductions in tension cause the inconvenience of an excessive release of wire length from the needle. The excess wire that is released becomes deposited irregularly on the core.

U.S. Pat. No. 4,826,012 describes a wire termination solution for avoiding waste wire in a machine for winding armatures. The connection of the wire ends of the coils occurs on the tangs of a commutator by using moveable tubes, which surround the commutator and extract wire from the flyer. The flyer accomplishes circular trajectories to dispense the wire on the armature.

SUMMARY OF THE INVENTION

An object of the present invention is that of minimizing the length of waste wire that needs to be cut as a result of the termination operations.

A further object of the present invention is that of reducing the number of cutting operations which are necessary during the termination operations.

It is also an object of the present invention to improve the capacity of positioning termination wires along predetermined paths which anchor and place the wires in contact with the terminal structures.

It is also an object of the present invention to accomplish wire paths of the intermediate termination on the opposite end of the core; that is on the end of the core that requires the dispenser to extend along the core for positioning the wire required for accomplishing the termination paths.

A further object of the invention is to improve the tension applied to the wire during winding and termination. In particular, the invention accomplishes the constancy of the tension occurring on the wire during winding and renders more predetermined the tension on the wire in the termination operations.

These and other objects of the invention are accomplished with the method, according to independent claim 1 and the apparatus according to independent claims 10 and 13.

Further characteristics of the invention are indicated in the dependent claims.

BRIEF DESCRIPTION OF THE DRAWINGS

The invention will now be illustrated by the description which follows relating to some typical embodiments with reference to the attached drawings.

In the drawings:

FIG. 2 is an enlarged view of portion 2 of FIG. 1 illustrating a device for applying tension to the wire according to the principles of the invention;

FIG. 2a is an enlarged view of a portion of FIG. 1, as seen from the direction 2a illustrating a path for winding a coil of the core;

FIG. 3a is an enlarged view of the portion 3a of FIG. 1 illustrating a stage of the termination operations according to the invention. FIG. 3a is also a view as seen from directions 3a-3a of FIG. 3b;

FIG. 3b is a view as seen from direction 3b of FIG. 3a;

FIG. 4b is a view as seen from directions 4b of FIG. 4a;

FIG. 5b is a view as seen from direction 5b of FIG. 5a;

FIG. 6b is a view as seen from directions 6b of FIG. 6a;

FIG. 11b is a view as seen from direction 11b of FIG. 11a;

FIG. 12b is a view as seen from direction 12b of FIG. 12a.

DETAILED DESCRIPTION

Figure 1:
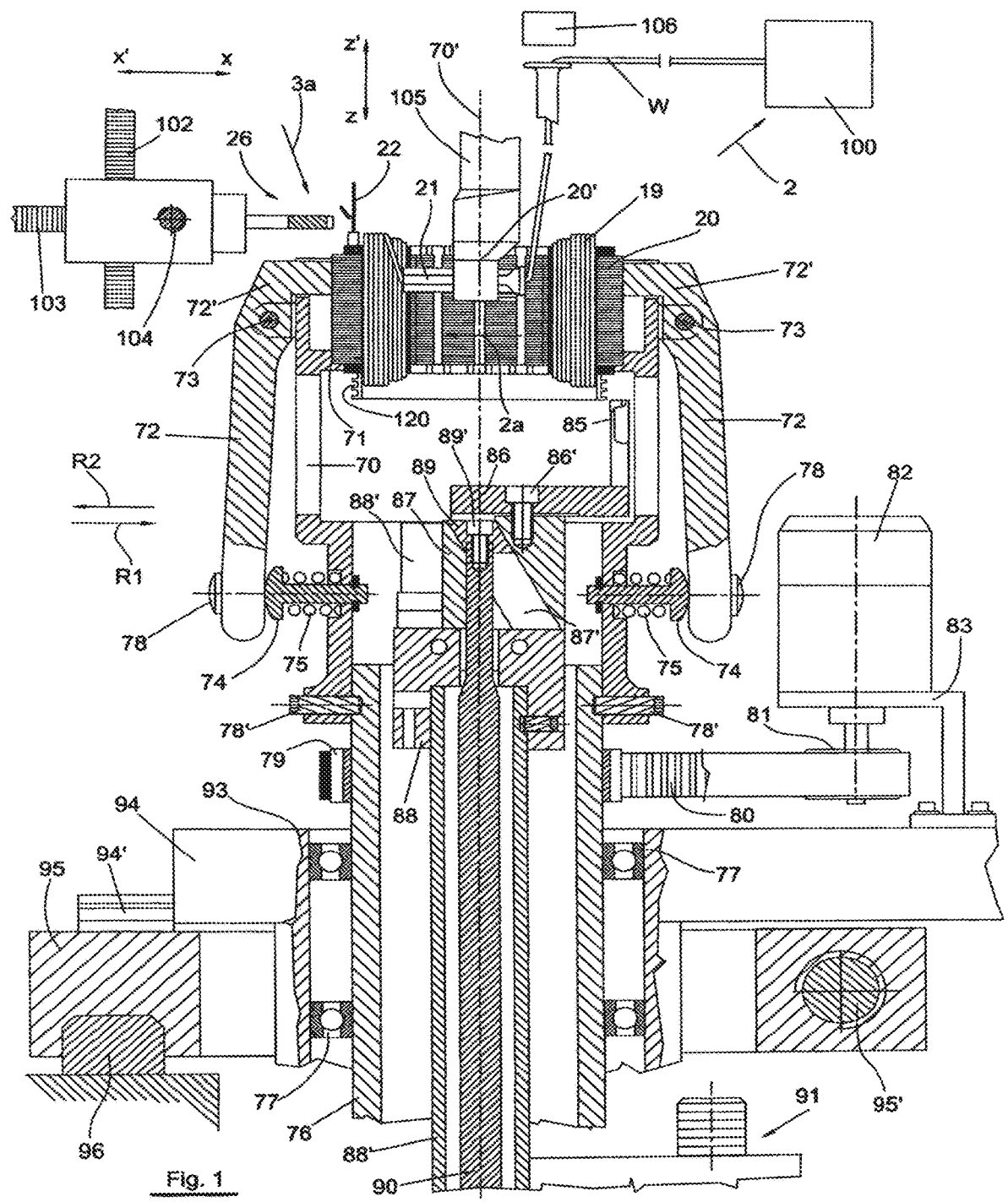
FIG. 1 is an elevation view of an apparatus for winding and terminating wire according to the invention.

With reference to FIG. 1, a core 20 is shown supported and positioned by a tubular support member 70. More particularly, core 20 is seated and supported in a groove of member 70. As a result, the core is centred and positioned with respect to axis 70' of tubular member 70. Therefore, longitudinal axis 20' of the core coincides with central axis 70', as shown in FIG. 1.

Arms 72 are hinged in 73 like appendixes of member 70. Portions 72' of arms 72 are provided that press on the external surface of core 20, as shown in FIG. 1, to maintain the core seated in groove 71. Portions 72' are maintained in contact with the core by the pressing action of pushing members 74, which push on the end portions of arms 72, as shown in FIG. 1.

Pushing members 74 are assembled on tubular member 70 to slide thereon in directions that radially depart from axis 70 in order to push on the end portions of arms 72 by means of the force of preloaded springs 75, as shown in FIG. 1.

By pushing in the opposite directions on the portions 78 of arms 72, that is against the force of the springs 75, arms 72 release the pressure action on the core and rotate to move away. This allows the core to be moved in direction Z' for being extracted from tubular member 70.

Member 70 is connected to a ring member 76, as shown in FIG. 1. The connection is accomplished with bolts 78', which press in seats of ring member 76, as shown in FIG. 1.

Ring member 76 is supported on radial bearings 77 for the rotation around axis 70'. The bearings are supported on a portion 93 of a platform 94.

Ring member 76 is provided with the toothed portion 79, which is engaged by toothed belt 80. Pulley wheel 81, which is driven by motor 82, drives toothed belt 80. Motor 82 is carried by bracket 83 which is supported by platform 94. Programmed rotations of motor 82 rotate core 20 around axis 20' in direction RO1 and RO2 (FIG. 2a) during winding and termination (FIGS. 11a-12b).

A needle 21 is supported by a carrying structure 105 with respect to which a wire W runs during winding and termination. The carrying structure 105 is moved in directions Z and Z' by a motor system 106 to translate and position needle 21 in directions Z and Z' during winding and termination.

By unscrewing bolts 78', member 70 can be disassembled from ring member 76 and substituted with another member 70 that is provided with groove 71 and has different dimensions in order to seat cores of other configurations.

Platform 94 is moved on guides 94' to translate in directions X and X' by using a programmable motor (not shown).

Guides 94' are assembled on a second platform 95, which is moved on guides 96 towards and away an observer of FIG. 1. Second platform 95 accomplishes these movements by means of a programmable motor (not shown) which turns a screw 95'.

The motions of platform 94 in directions X and X' can be used to position core 20 during the termination operations. Similarly, the motions of second platform 95 in directions Y and Y' can be used during termination and winding to position core 20, for example during winding to stratify the wire when winding the coils.

The motion of the second platform 95 in directions Y and Y', i.e. towards and away with respect to the observer viewing FIG. 1, can be employed for moving the finished core away from the working area of the apparatus, or to position a core to be processed in relation to the working area of the apparatus. During this movement in directions Y and Y', portions 78 of arms 72 can come in contact with a cam surface, which is appositely profiled to move arms 72 away from the core in order to free the core so that it can be unloaded and substituted with a core to be processed.

A deflector 85 is assembled on a radial arm 86 in order to extend parallel to axis 20', as shown in FIG. 1. Radial arm 86 is assembled on the end of first support member 87 by means of a bolt 86'. First support member 87 is assembled in a groove 88' of a second support member 88. The groove has a diameter extension with respect to axis 70'. Consequently, First support member 87 accommodates in a portion of support member 70 of core 20 as shown in FIG. 1.

First support member 87 is provided with an inclined groove 87' where a cursor 89 slides in a guided manner. Cursor 89 is fixed to the end of a shaft 90 by means of a bolt 89'. This is possible because shaft 90 is inserted in a bore of second support member 88; the bore is in communication with groove 87', as shown in FIG. 1.

By moving shaft 90 in direction Z, cursor 89 moves in inclined groove 87' to push support member 87 in a direction R2, as it is allowed by the guiding function of groove 88'.

Therefore, deflector 85 is moved in direction R2 towards the centre of core 20 and along a radius with respect to axis 20' (see also FIGS. 11a-12b).

By moving shaft 90 in direction Z', cursor 89 moves in the inclined groove in an opposite direction to push support member 87 in radial direction R1, as it is allowed by the guiding function of groove 88'. Therefore, deflector 85 is moved in direction R1, i.e. towards the outside of core 20 and along a radius with respect to axis 20'.

Second support member 88 is provided with a tubular part 88", which extends coaxial to axis 20' as shown in FIG. 1. Shaft 90 extends coaxially inside tubular part 88" as shown in FIG. 1. Tubular part 88" is moved in directions Z and Z' by a screw sleeve system 91, which is moved by a programmable motor (not shown). In this manner, deflector 85 is moved according to programmable positions in directions Z and Z' to be aligned with slots like 120 of an end D of the core 20 (FIGS. 11a-12b).

Shaft 90 is moved in directions Z and Z' by an actuator (not shown) to position deflector 85 in predetermined positions of directions R1 and R2.

The solution for applying tension to wire W, indicated also as 100, is shown more in detail in FIG. 2. The wire W is wound around pulley wheel 30 for at least one turn. The idle wheel 31 presses on the wire because it is pushed by actuator 32, which is set with a predetermined force.

Pulley wheel 30 is driven by a controlled motor 33. Motor 33 is able to produce predetermined torques on pulley wheel 30 in two rotation directions RP1 and RP2 by following a program. The torques in direction RP2 are opposite to the direction of the wire running towards needle 21. These torques are transformed into a tension T1 on wire W.

Tension T1 tends to drag the wire, therefore it creates a tension on wire W when the latter exits the needle, or the tension T1 is able to draw wire W from the needle when the tension of wire W becomes zero.

The torques in the rotation direction RP1 will be in the same direction as the running of the wire towards needle 21. These torques cause a pushing action T2 on the wire W. Pushing action T2 tends to feed the wire W out of the needle, or it reduces the drag existing on wire W.

Pulley wheel 34 pushes the wire in a direction G due to the predetermined pushing force caused by piston 35. In this way an additional trajectory is generated for the wire when predetermined lengths of wire W are withdrawn by pulley 30 due to rotation in direction RP2. In this situation, the wire upstream of pulley 34 is blocked by brake device 35'. To block the wire, the brake device 35 presses on the wire by means of a part 36, which pushes the wire against a member 37. Part 36 is moved for pressing on the wire, and therefore to block it when a cam 38', on which a wheel 38 runs, moves in direction G.

In particular, wheel 38 is integral to part 36, while the cam is integral to the shaft of piston 35, which moves pulley wheel 34. The cam presents a profile, which causes wheel 38 to move as a function of the position of pulley 34 in its movements in directions G and G'.

Therefore, when pulley 34 moves in direction G to create the additional trajectory, cam 38' moves wheel 38 in direction Z' to cause the wire to be blocked by part 36, and thereby causes that no further wire is fed by the wire source which is upstream of the brake device 35'. In this way, the length of wire withdrawn by pulley 30 occupies a predetermined additional trajectory, which extends between the brake device 35 and pulley wheel 30. When there is a decrease in tension during the trajectories accomplished by the needle and consequently excessive release of the wire length, the additional trajectory created by pulley wheel 34 causes a withdrawal of excessive length of wire and is able to stabilize the tension of wire W.

Winding of a coil around a pole 20" of the core requires that the wire exit accomplishes a trajectory TR with respect to the pole of the core as shown in FIG. 2a. The trajectory TR is accomplished for winding a turn of the coil and needs to be repeated as many times as is the number of turns of the coil.

The trajectory TR consists of a translation TR1 in direction Z of the needle 21 when moved by motor system 106. Stretch AR1 follows and consists of a combination of rotations of the core in direction R01, driven by motor 82, and translations of the needle in directions Z and Z'. Afterwards translation TR2 of the needle 21 in direction Z' occurs driven by system 106. Lastly stretch AR2 occurs, consisting of a combination of rotations of core 20 in direction R02, driven by motor 82, and translations of the needle in directions Z and Z'.

During a trajectory like TR the tension on the wire increases during translations TR1 and TR2, therefore in the solution 100 for applying tension to the wire W torques are applied to pulley wheel 30 in direction RP1, which is in the same direction as the running direction of the wire W towards the needle. The tension is applied as a function of the position of the needle during translations TR1 and TR2. This will produce a pushing action T2 on the wire, which tends to feed the wire out of the needle, or reduces the tension existing during the translations TR1 and TR2.

In stretches AR1 and AR2 the tension of the wire decreases because movement on the first part of these trajectories can produce an excessive length of wire—see length of wire W1 that needs to be wound against the shorter part of the pole 20". Consequently, torques will be applied to pulley wheel 30 in direction RP2, which is opposite to the direction in which wire is running towards the needle. The tension is applied as a function of the position of the needle during rotation of the core. This will produce a tension T1 on the wire W, which tends to recover a predetermined length of wire from the needle, or increases the tension existing on the wire along stretches AR1 and AR2.

A sequence of operations for connecting a final wire W1 of a wound core to a tang 22 and for accomplishing the initial connection to a tang of a core 20 to be wound are shown starting from FIG. 3*a*.

During the sequence of operations, movement occurs of wire gripper 26 (see also FIG. 1), needle 21 and core 20 together with tang 22. Wire gripper 26 is moved in an electronically controlled way to obtain predetermined displacements in directions Z and Z', X and X', Y and Y' using respectively screw/sleeves mechanisms 102, 103, and 104.

Each of these screw/sleeve mechanisms is moved by a respective controlled motor (not shown), which follows a program. The core 20 together with the tang 22 are moved by a translating platform 94 in directions X and X', and by a translating platform 95 in directions Y and Y' (directions perpendicular to the view of FIG. 1, where the direction Y enters into the page of FIG. 1, whilst the direction Y' exits from the page of FIG. 1). Each platform 94 and 95 is moved by a respective controlled motor (not shown) which follows a program.

During the relative motions of wire gripper 26 and tang 22 with respect to needle 21 there are stages where the lengths of wire are fed from the needle 21 by means of pulley wheel 30 to reduce tension, whilst in other stages lengths of wire will be withdrawn from the needle by pulley wheel 30.

FIGS. 3*a* and 3*b* show needle 21 oriented parallel to axis 20' of core 20, and after needle 21 has been displaced from the dashed line position A to position B (in direction Z) to place a stretch W1 of wire W in seat 22' of final tang 22 of a wound core. During the inverse movement of the needle from the dashed line position B to position A (see also FIG. 4*a*), tension T1 is applied to the pulley wheel 30 to retrieve a predetermined length of wire from the needle, therefore for guaranteeing that outside the needle the wire does not loosen excessively.

In position B (see FIG. 3*b*), the needle 21 has been positioned in seat 23' of portion 23 of the wire gripper using the vertical movement in direction Z of the needle and then a movement of portion 23 of the wire gripper 26 in direction Y'. During the movement in direction Z the wire passes through aperture 24'. These movements have resulted in the stretch of wire W2 being under side S1 of the holding part of the wire gripper 26, as shown in FIGS. 3*a* and 3*b*. Successively, by using a vertical movement of the needle in direction Z', the needle can return to position A outside the wire gripper, as shown in FIG. 4*a*.

Figure 4A:
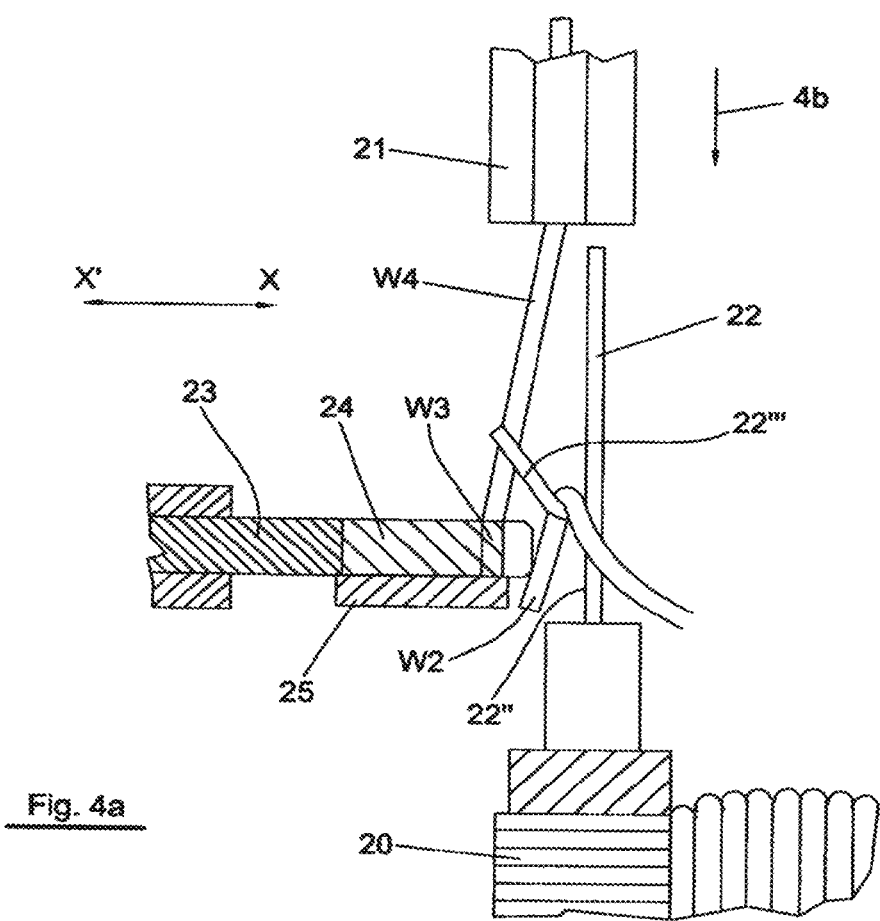
FIG. 4a is a view similar to the view of FIG. 3a illustrating a further stage of the termination operations according to the invention.
Figure 4B:
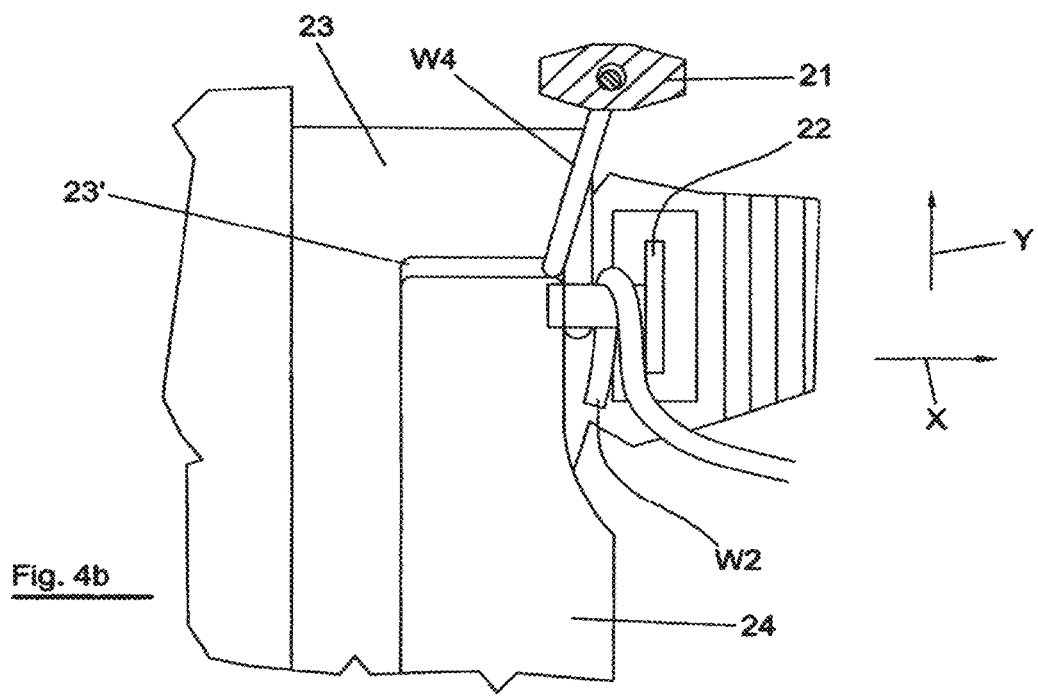

FIGS. 4*a* and 4*b* show that part 24 of the wire gripper has been translated in direction Y for grasping the stretch of wire W3 within seat 23'. Furthermore, prior to the situation of FIGS. 4*a* and 4*b* also cutting blade 25 has been moved in direction Y to cut stretch W3 to a required length against side S1.

Then, and also shown in FIGS. 4*a* and 4*b*, the wire holding portion 23 can move in direction X to push with its external structure the remaining cut stretch W2 against base portion 22" of tang 22.

The position occupied by stretch W2 against the base part 22" of the tang 22 is such that the structural part 22''' is clear of the wire and can be the part where the electrode contacts during fusing operations to deform and heat the tang and wire, like has been described in European Patent 419,849.

Consequently after the operations of FIGS. 4*a* and 4*b*, the core is finished and terminated as regards final tang 22, and the wire gripper 26 remains holding end W3 that extends to needle 21 by means of stretch W. The stretch of wire extending beyond the wire gripper 26 on the opposite side with respect to needle 21 has been cut by blade 25 at a predetermined distance from side S1 of the wire gripper without producing wire waste.

Figure 5A:
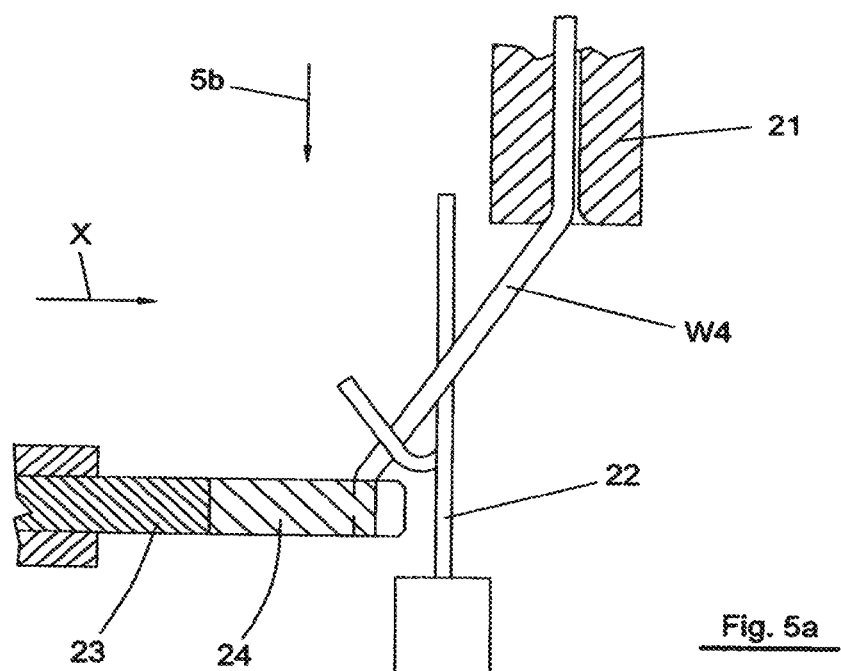
FIG. 5a is a view similar to the view of FIG. 3a illustrating a stage of the operations according to the invention for terminating a further core to be wound.
Figure 5B:
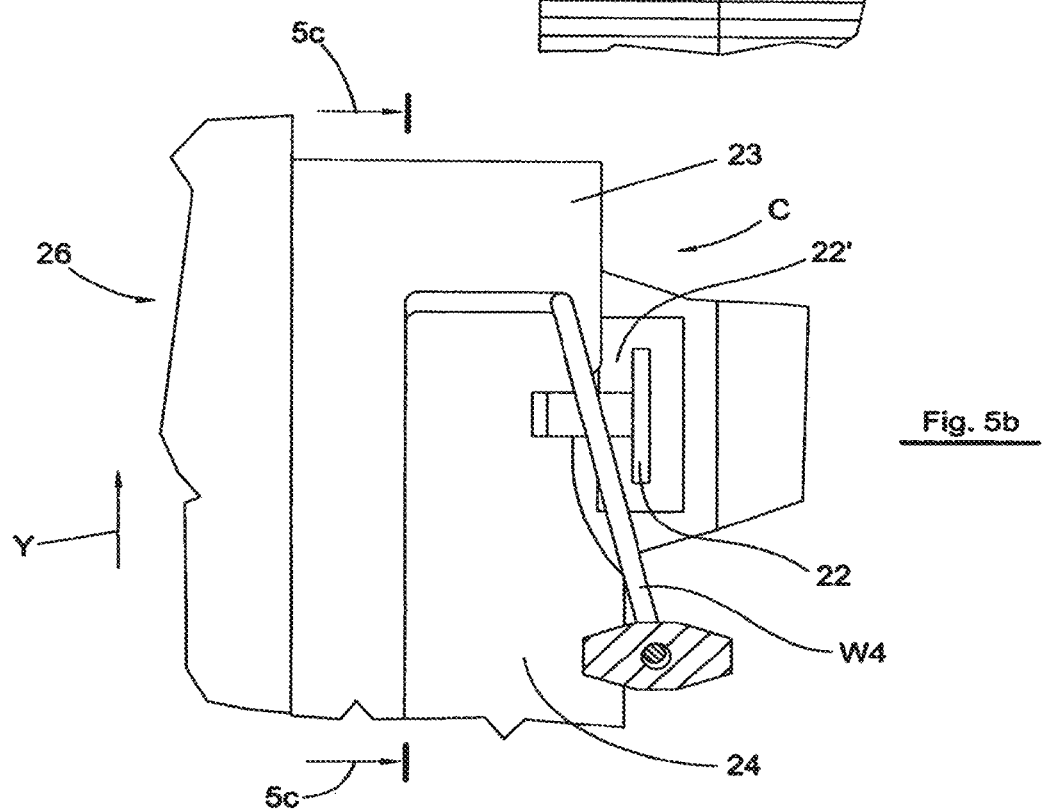
Figure 5C:
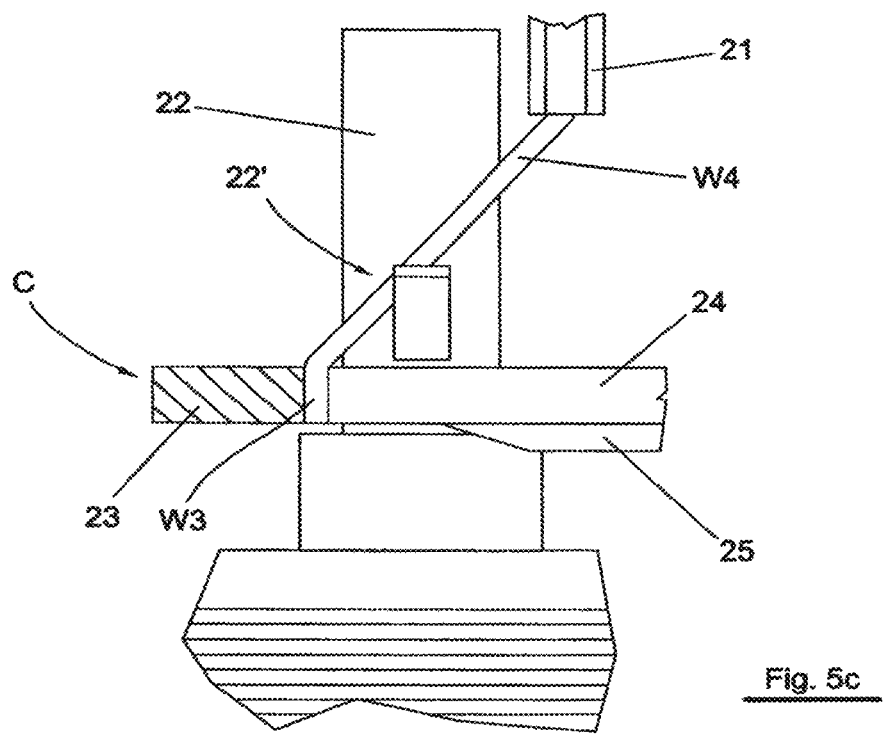
FIG. 5c is a view as seen from directions 5c-5c of FIG. 5b.

In FIGS. 5*a*, 5*b* and 5*c*, the wire gripper 26 holds the stretch of wire W4 which extends to needle 21 in preparation for connection to the initial tang 22 of a core to be wound and has moved in direction X to bring the holding portion in position C near to the entrance on one side of seat 22' of initial tang 22.

Figure 6A:
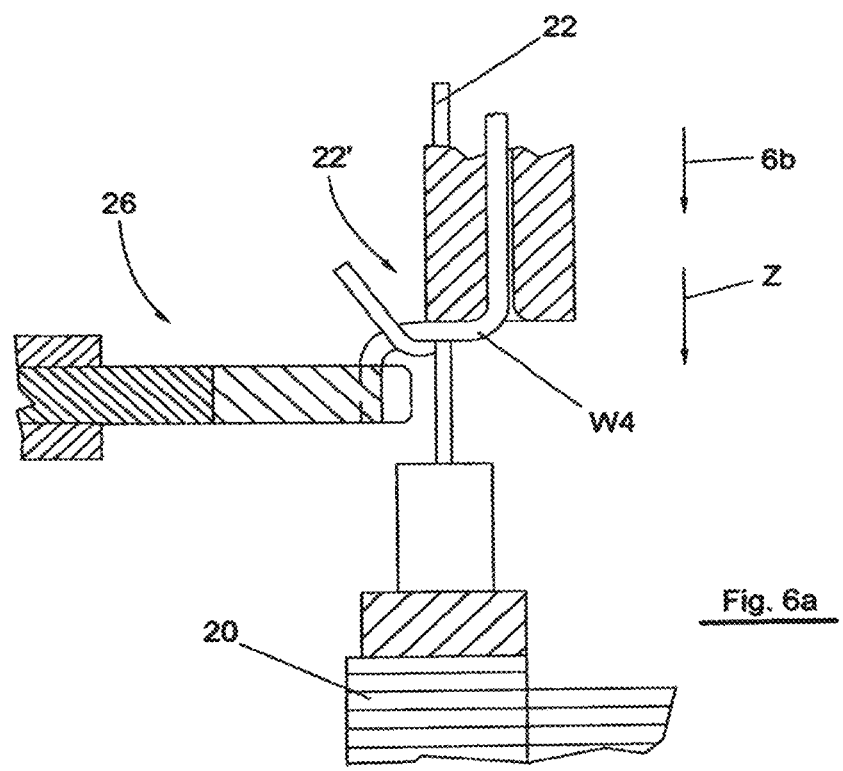
FIG. 6a is a view similar to the view of FIG. 5a illustrating a successive stage with respect to the stage of FIG. 5a of the termination operations according to the invention.
Figure 6B:
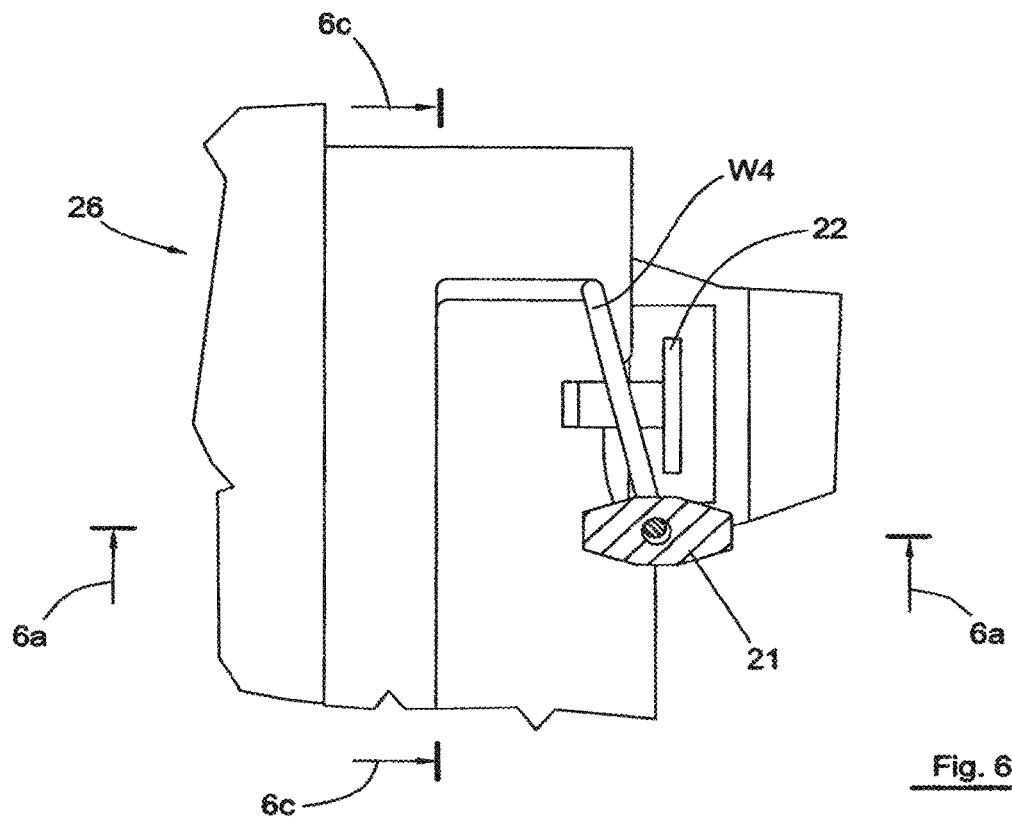
Figure 6C:
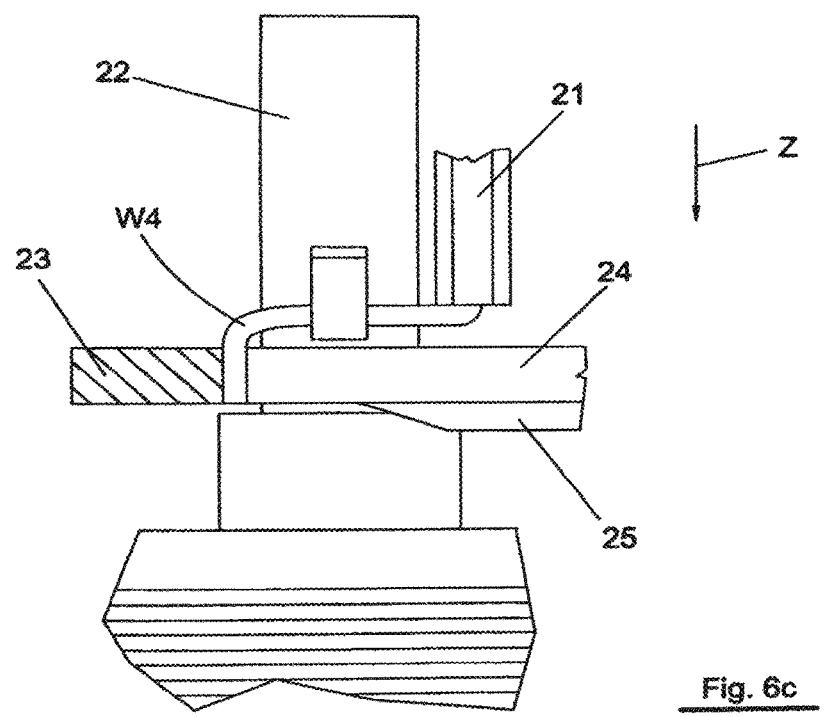
FIG. 6c is a view as seen from directions 6c-6c of FIG. 6b.

In the sequences of FIGS. 6*a*, 6*b* and 6*c*, which follow those of FIGS. 5*a*, 5*b* and 5*c*, the needle has moved in the vertical direction Z to position a portion of stretch W4 in seat 22' of initial tang 22. The wire enters seat 22' through the entrance of seat 22' on side of position C where the wire gripper 26 is positioned (see in particular FIGS. 6*b* and 6*c*). When the needle translates in direction Z as mentioned, pulley wheel 30 applies a tension T1 to withdraw a certain length of wire, which goes and occupies the additional trajectory created by pulley wheel 34 and wire brake device 35.

Figure 7:
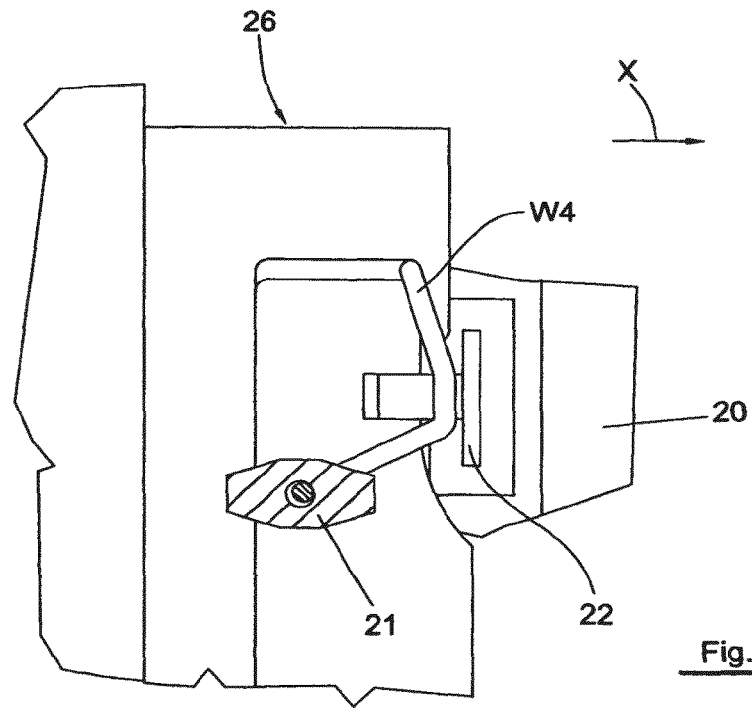
FIG. 7 is a view similar to the view of FIG. 6b illustrating a successive stage with respect to the stage of FIG. 6a of the termination operations according to the invention.

In FIG. 7, wire gripper 26 and core 20 have been moved with respect to needle 21 with movements in direction X that are synchronized for starting to wind a portion of stretch W4 around tang 22, as shown. To accomplish these movements, platform 94 has been moved in direction X for a movement that is synchronized with the motion of the screw/sleeve mechanism 103 which moves the wire gripper 26 in direction X.

Figure 8:
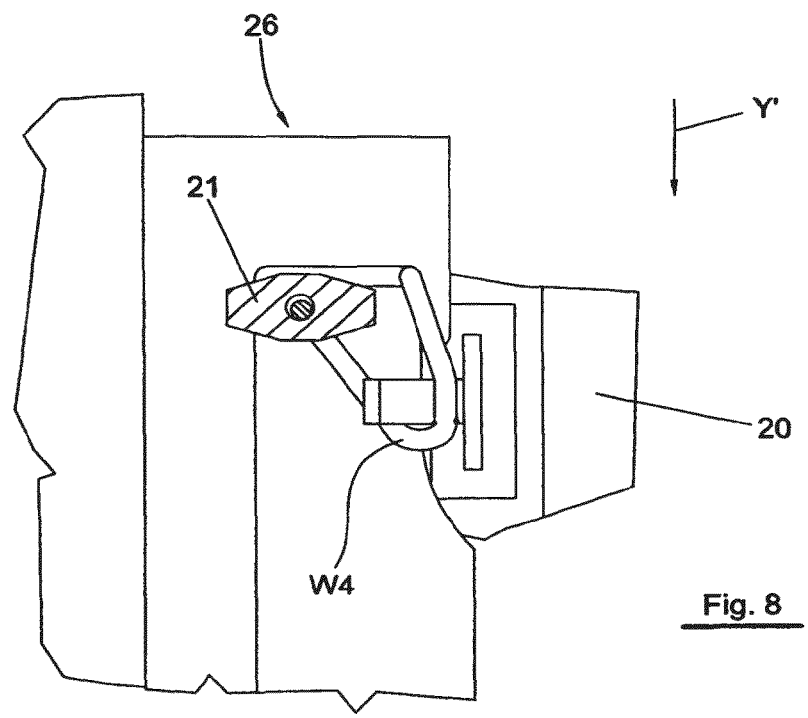
FIG. 8 is a view similar to the view of FIG. 7 illustrating a successive stage with respect to the stage of FIG. 7 of the termination operations according to the invention.

In FIG. 8, the wire gripper 26 and the core 20 have been moved with respect to needle 21 in direction Y' with further synchronized movements to continue to wind a further portion of stretch W4 around tang 22, as shown. To accomplish these movements, platform 95 has been moved in direction Y' for a movement that is synchronized with the motion of the screw/sleeve mechanism 104, which moves the wire gripper 26 in direction Y'.

Figure 9:
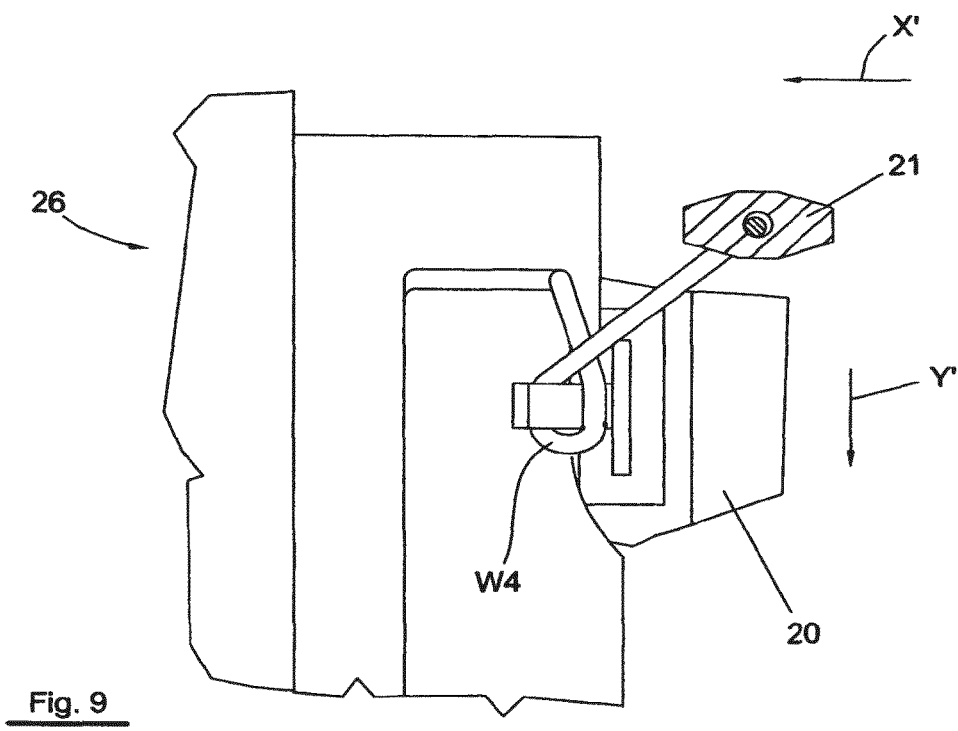
FIG. 9 is a view similar to the view of FIG. 8 illustrating a successive stage with respect to the stage of FIG. 8 of the termination operations according to the invention.

In FIG. 9, the wire gripper 26 and the core 20 have been moved with respect to needle 21 in directions X' and Y' with further synchronized movements to complete winding a portion of the stretch W4 around tang 22, as shown.

Figure 10:
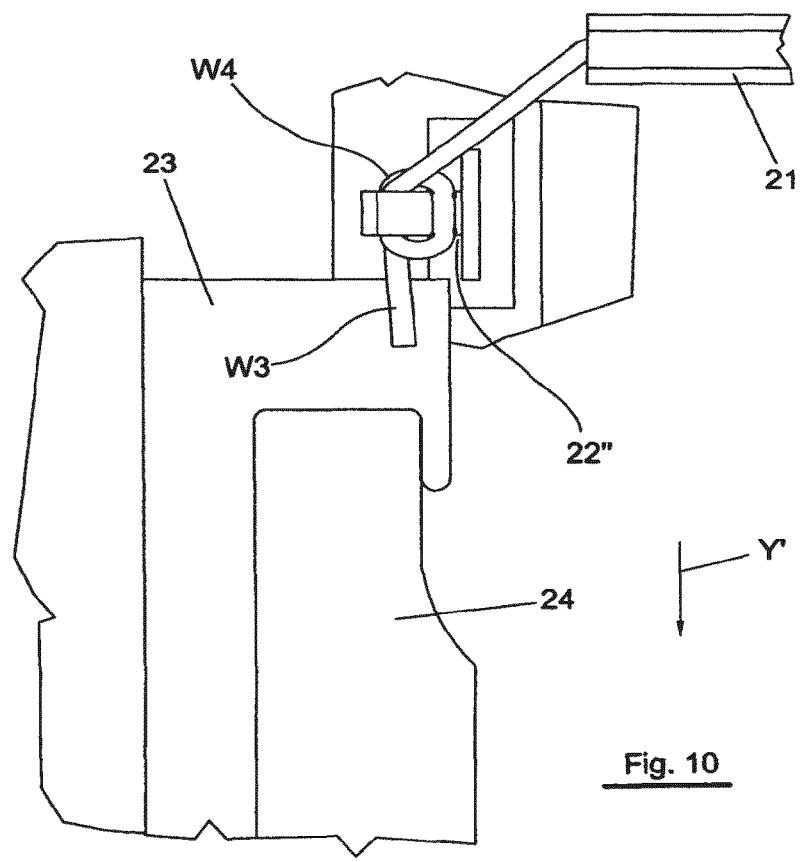
FIG. 10 is a view similar to the view of FIG. 9 illustrating a successive stage with respect to the stage of FIG. 9 of the termination operations according to the invention.

In FIG. 10, wire gripper 26 has moved in direction Y' and during this movement has released the hold on the final portion W3 in front of base 22" of tang 22 to push and therefore direct W3 in front of base 22" of tang 22. Furthermore, in FIG. 10 the final portion W3 has come out of the holding portion of gripper 26.

Still with reference to FIG. 10, the needle 21 has been oriented back to a perpendicular position according to the orientation for winding. At this point the needle 21 can start winding a coil that will have an initial wire anchored to tang 22 like is shown in FIG. 10.

The synchronized movements accomplished by wire gripper 26 and tang 22 in the stages of FIGS. 5a-10 have occurred by means of synchronized translations that are parallel to a plane perpendicular to axis 20' of core 20, and wire W has been fed in a direction that is perpendicular with respect to the plane in order to reach the exit of needle 21. The synchronized movements of the wire gripper 26 and of tang 22 occur for predetermined displacements of a controller program to guarantee positioning of stretch W4 with respect to tang 22 with extreme accuracy and with limited room.

During the synchronized movements of the wire gripper 26 and tang 22, the pulley wheel 30 undergoes application of predetermined torques in directions RP1 and RP2 which are synchronized with the movements of the wire gripper 26 and the tang 22.

The sequence of operations illustrated with reference to FIGS. 3a-10 have achieved the connection of final wire to a tang of a wound core and the connection of an initial wire to the tang of a core to be wound. These operations have occurred without producing stretches of waste wire and also by positioning the end of wire W3 adjacent to base 22" of tang 22 and along a definite termination path. Furthermore additional cutting has not been required after the cutting performed at the required measurement to terminate the wound core as shown in FIGS. 3a-4b.

Figure 11A:
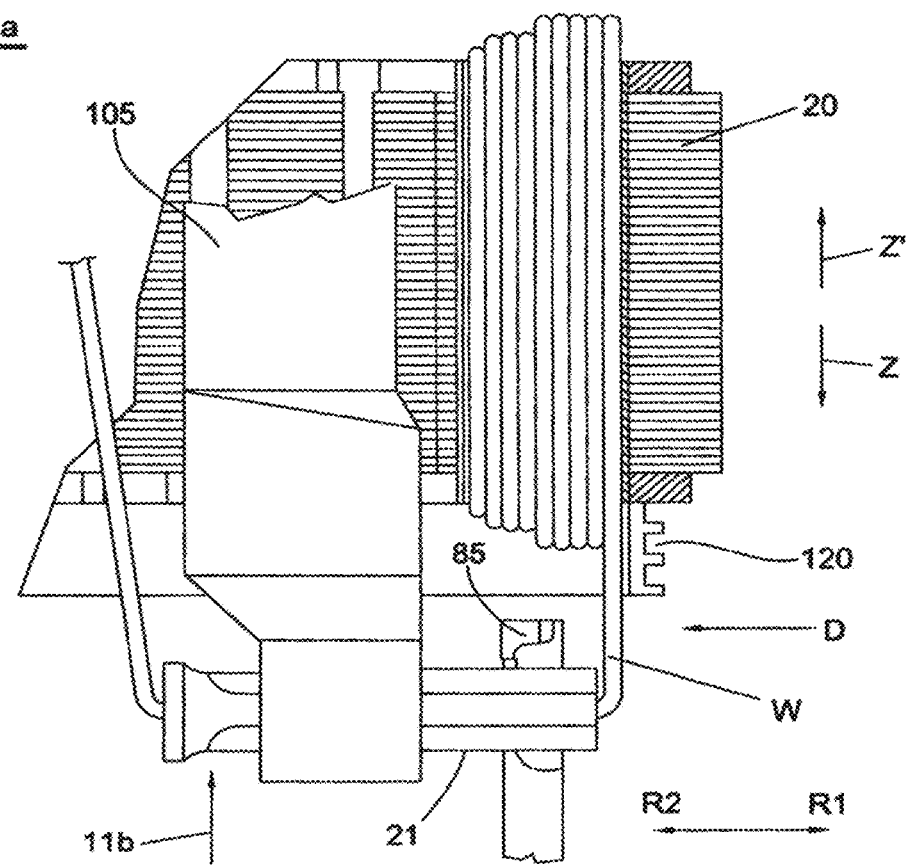
FIG. 11a is an enlarged view of a portion of the view of FIG. 1 illustrating a specific stage of the intermediate termination according to the invention.
Figure 11B:
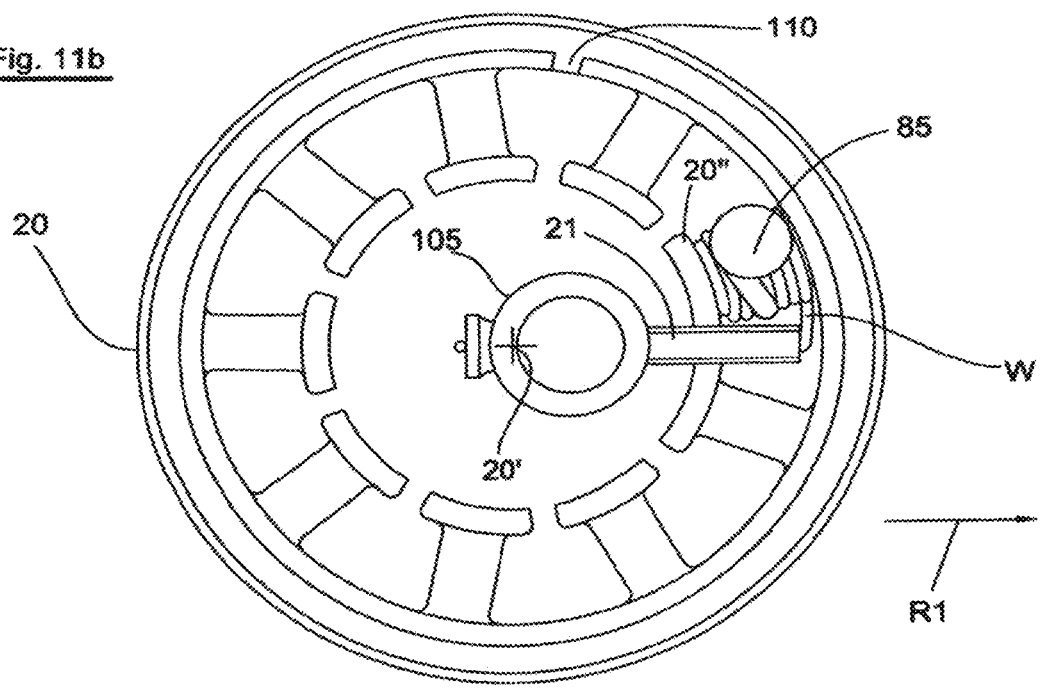
Figure 12A:
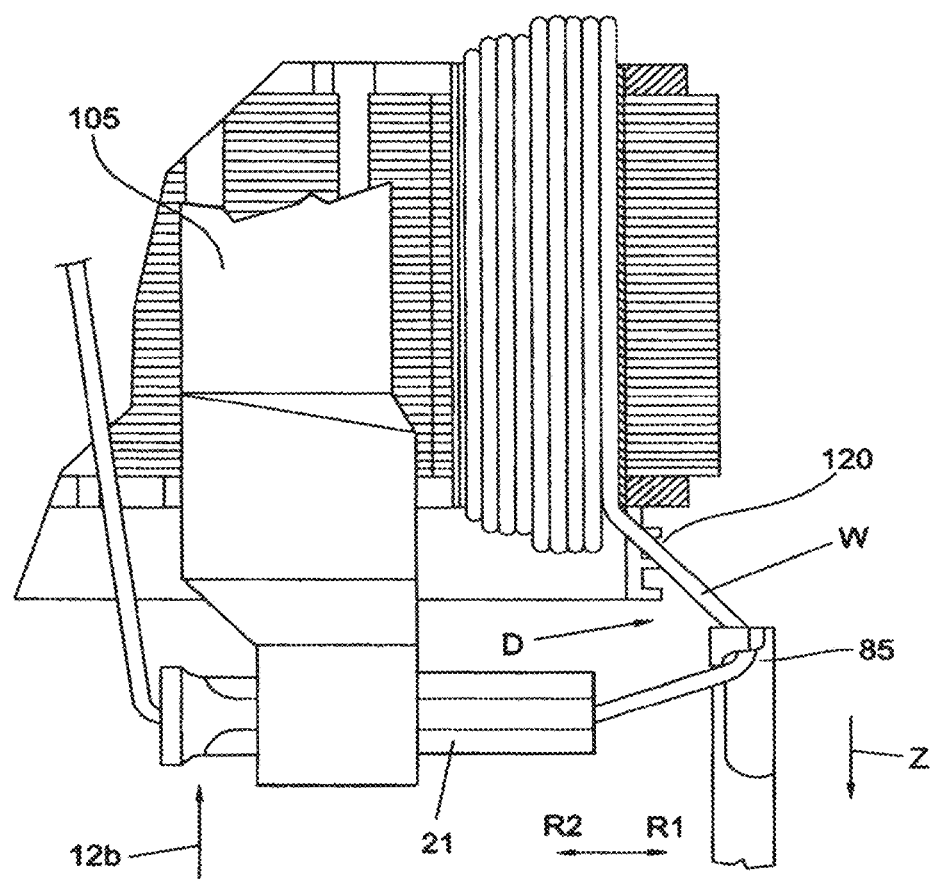
FIG. 12a is a view similar to the view of FIG. 11a, illustrating a successive stage with respect to the stage of FIG. 11a of the operations according to the invention.
Figure 12B:
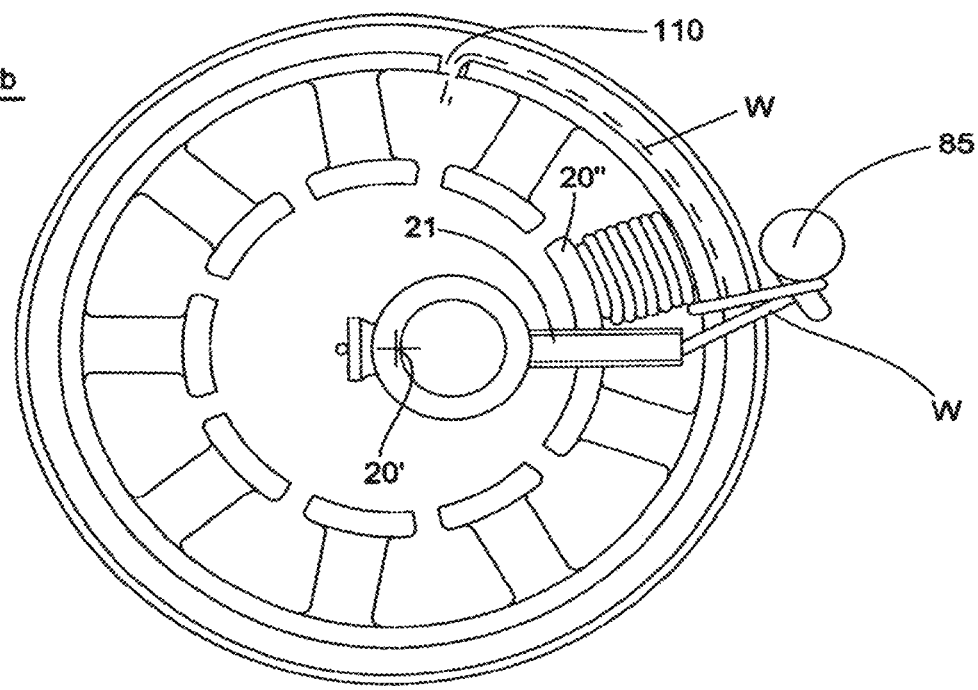

With reference to FIGS. 11a-11b, the needle 21 has finished winding pole 20'' and wire W needs to be positioned in groove 120 of core 20. Groove 120 extends for a circular stretch around axis 20' adjacent to the end of core 20. Normally wire W is disposed in a portion of groove which leads to a pole where a coil needs to be wound. As shown in FIGS. 1, 11a and 12a, the end of core D where the groove is positioned is opposite to end where the needle initially reaches the core before crossing it to wind the coils.

In the situation of FIGS. 11a and 11b, the needle 21 is stationary with the wire extending from a finished coil. Deflector 85 is in a radial internal position ready to move in direction R1 and in direction Z' to occupy a predetermined position with respect to groove 120.

With reference to FIGS. 12 a and 12b, the core has been rotated around axis 20' and deflector 85 has been moved in direction R1 to intercept the wire W and bring it in a more external position. In the external position of deflector 85, a stretch of the extension of wire W is aligned with groove 120, as shown in FIG. 12a. Continuing with a predetermined rotation of the core around axis 20', wire W is wound in groove 120 by running on deflector 85 and exiting needle 21. In this manner it is possible to reach an angular position of the core around axis 20' where the wire can exit groove 120 and pass through passage 110. By passing through passage 110, the wire can return towards the centre of the core where it reaches a next pole to be wound. To achieve this path, deflector 85 is moved in direction Z and direction R2 to free the wire and avoid collision with core end D. The wire that has been released in this sequence is withdrawn by pulley wheel 30 of the device to create tension so that the wire is pulled though passage 110 and maintained tensioned within needle 21.

In other embodiments of the invention the core can be provided with external slots, consequently the needle, instead of passing through the core as shown in FIG. 1, will move along the outside of the core to reach end D where groove 120 is located.

In the sequence of operations of FIGS. 3a-10, for certain termination paths the translations of the tang 22 can be substituted with rotations of the tang 22 around axis 20' (achieved by rotating the core around axis 20'). Therefore in certain cases it can be foreseen to rotate tang 22 and to move gripper 26 in a synchronized manner to obtain connection of the wire to tang 22.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A method for winding and terminating coils wound with at least one electric wire one a core of a dynamo electric machine, the core having a longitudinal axis and being supported by a tubular support, the method comprising:
    winding a wire over a pulley wheel;
    feeding the wire into a wire dispenser having a tubular portion for passage of the wire and an exit from where the wire reaches the core;
    dispensing the wire from the wire dispenser;
    translating the dispenser with respect to the core during winding or the termination of leads;
    rotating the tubular support around a rotation axis;
    recovering a portion of the wire returning from the pulley; and
    applying torque in two directions on the pulley wheel as a function of the position of the dispenser in the translation and the position of the core in the rotation.

2. The method according to claim 1 wherein the torque is applied in the feeding direction of the wire towards the dispenser in the translation stage of the dispenser to wind the core.

3. The method according to claim 1 wherein the torque is applied in a direction opposite to the director for feeding the wire towards the dispenser during the rotation stage for winding the core.

* * * * *